Patented Dec. 15, 1925.

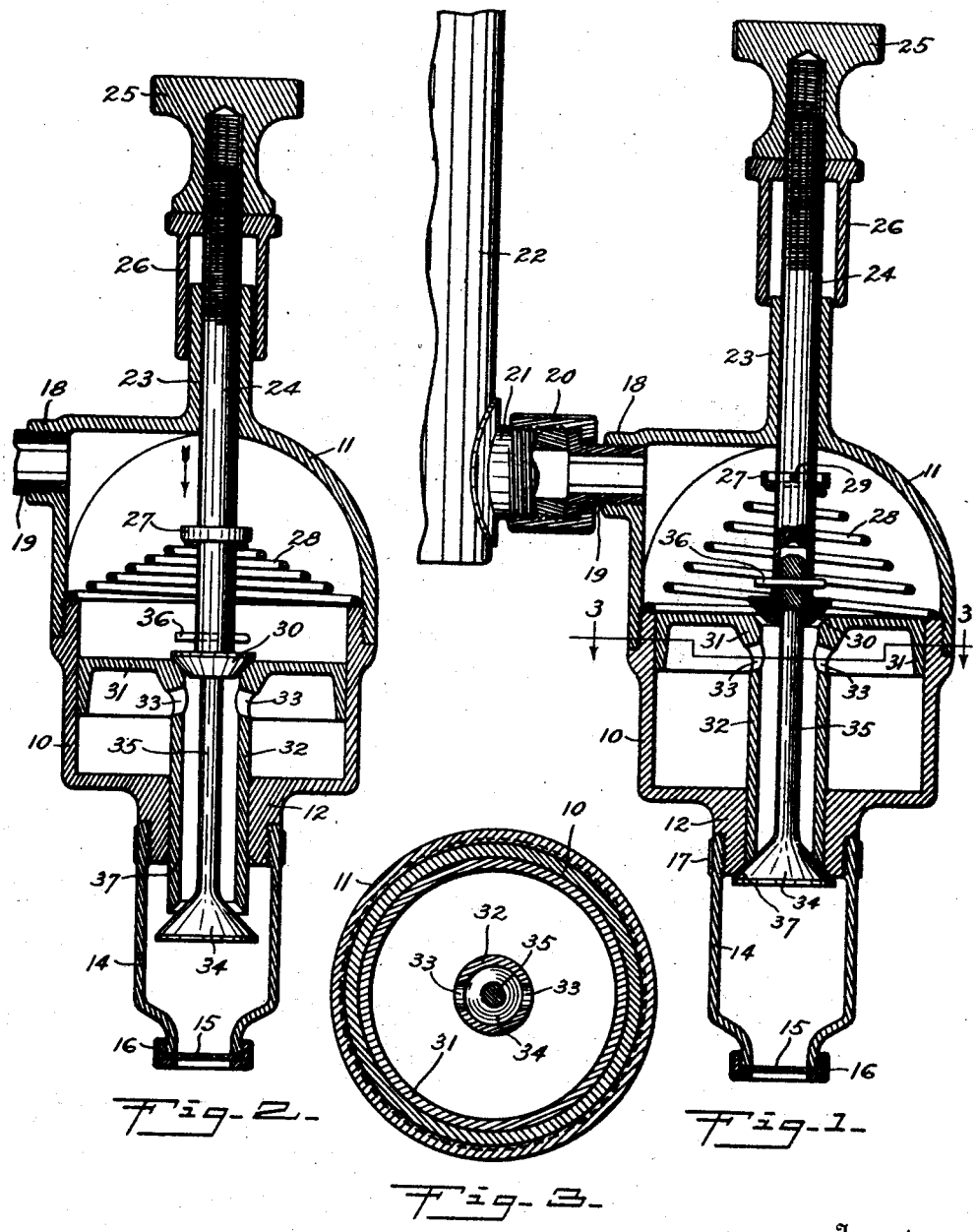

1,565,686

UNITED STATES PATENT OFFICE.

THOMAS L. TITUS, OF OMAHA, NEBRASKA.

DISPENSING VALVE.

Application filed January 24, 1925. Serial No. 4,559.

*To all whom it may concern:*

Be it known that I, THOMAS L. TITUS, a citizen of the United States, residing at Omaha, in the county of Douglas and State of Nebraska, have invented certain new and useful Improvements in Dispensing Valves, of which the following is a specification.

My invention relates to dispensing valves, or devices for delivering measured quantities of liquid from a container. It is the object of my invention to provide a simple and efficient device which may be manually operated to deliver from the container with which it is connected any desired amount of liquid not in excess of a predetermined quantity, the desired sub-maximum quantity being ejected at each operation, and the measuring chamber being automatically refilled after each ejecting operation, so that the same may be repeated immediately if desired. The device provided by my invention is particularly adapted for use in cafeterias and restaurants for dispensing beverages and beverage ingredients, such as cream for use in coffee. A further object of my invention is to provide a device of this character having means by which dripping or after-flow of the liquid is prevented, following the ejecting or delivering operation. A further object is to provide a device of the class set forth, by which a relatively thick or viscid liquid may be quickly delivered, by being positively ejected instead of merely being permitted to flow by gravity. A further object is to provide a device of this kind in which the parts may be easily disconnected to facilitate cleansing thereof.

In the accompanying drawings Fig. 1 is a vertical sectional view of a structure embodying my invention, the parts being in normal position, Fig. 2 is a similar view showing the movable parts at mid-stroke of the ejecting operation, and Fig. 3 is a horizontal section on the line 3—3 of Fig. 1.

In the illustrated structure I provide a casing comprising a lower cylindrical portion 10 and an upper cover or dome-shaped portion 11 which is screwed onto the threaded upper end of the cylinder 10. At the lower end of the cylinder is a tubular neck 12 which is threaded externally to receive the spout 14. At its lower end the spout is reduced in diameter and externally threaded, and against said end is seated a screen 15 which is held in place by a flanged ring 16 screwed upon the threaded spout-end, as shown. The ring 16 and an annular portion 17 at the upper end of the spout are knurled to facilitate the unscrewing thereof by hand when it is desired to disconnect the parts for cleaning. At one side of the upper portion of the dome 11 is an internally threaded neck 18 into which is screwed the flanged nipple 19 of a pipe-union comprising said nipple, a knurled union-nut 20, and the male union-member 21 with which the nut 20 is detachably engaged, said member 21 being connected fixedly with the lower portion of the receptacle 22 containing the liquid to be measured and delivered by the device. At the upper end of the dome, and arranged coaxially with the cylinder 10, is a tubular neck 23 through which the valve-stem 24 passes slidably. The upper end of the stem 24 is threaded and is screwed into the lower portion of a knob 25. Below the knob is an inverted cup-shaped member 26 of which the cylindrical lower portion fits loosely over the neck 23 of the dome, and the upper end-portion is screwed onto the valve-stem beneath the knob 25. The member 26 may be adjusted to different positions upon the stem, so that by striking the upper end of the neck 23 it may serve as a variable stop for limiting downward movement of the stem. The knob 25, being screwed down against the stop-member 26, serves as a locknut for holding the latter in adjusted positions. Upon the valve-stem 24 in the upper portion of the dome-chamber is a cup-shaped washer 27 which forms an abutment for the small upper end of a conical coil spring 28, the large lower end of said spring resting upon the upper edge of the cylinder 10. The spring pressure against the washer holds the same against a pin 29 extended through the valve-stem, said pin being of such length as to lie within the upturned marginal flange of the washer, and being thereby prevented from accidental displacement. At the lower end of the stem 24 the valve 30 is affixed thereto or formed integrally therewith. Said valve 30 is adapted to engage a seat formed at the center of a piston 31 which fits slidably within the cylinder 10. A tubular stem 32 is formed integrally with the piston and extends downwardly therefrom through the cylinder and the neck 12, the stem fitting slidably within said neck. The longitudinal passage through the stem is continuous with the opening through the piston at the seat for the valve 30, and in the sides of the stem are the holes or ports 33 which connect the cylinder-space with said longitudinal passage. At its lower end the stem 32 is beveled inwardly to form a seat for the valve 34. Said valve has a stem 35 which extends up through the piston and fits loosely within an axial opening in the lower portion of the stem 24, the lower stem being connected with the upper by a transverse pin 36, as shown. The valve 34 is larger in diameter than the tubular piston-stem 32, whereby the outer portion of said valve, which projects laterally beyond the seat at the end of said stem 32, is adapted to engage a second seat 37 formed at the lower end of the cylinder-neck 12.

The valve 34 is normally held in engagement with the seat 37 by the upward pressure of the spring 28, transmitted through the washer 27, pin 29, and valve-stems 24 and 35, and said valve 34, by its engagement with the stem 32, also serves to hold the piston normally in the raised position shown in Fig. 1. The piston and its stem may be so fitted in the cylinder 10 and neck 12 as to be movable therein by gravity, or so that the weight of the piston will be sufficient to cause it to move downwardly in the cylinder except when it is held up by the pressure of the valve 34 against the seat at the lower end of the stem 32. The valves 30 and 34 are so spaced apart that when either is closed or engaged with its seat the other will be open. The slightly flexible connection between the valve-stems 24 and 35 enables each of the valves to seat properly should there be any slight mis-alinement of the stems.

The parts being in the normal position shown in Fig. 1, downward pressure upon the knob 25 first moves the valves downwardly to open the lower valve 34 and close the upper valve 30 upon its seat. By continued downward movement the upper valve 34 presses the piston downwardly in the cylinder, causing the contents of the cylinder-space below the piston to be ejected through the ports 33 and the tubular stem 32, past the lower valve 34 and into the spout 14, whence the ejected liquid is discharged through the screened lower end of said spout. When the pressure upon the operating-knob 25 is removed, the spring 28 first lifts the valve assemblage until the lower valve 34 engages the seat at the end of the stem 32, the upper valve at the same time being lifted from its seat, and the continued upward movement of the valves then raises the piston to its normal position at the upper end of the cylinder. During the upward movement of the piston, liquid from the dome 11, supplied thereto from the receptacle 22 through the described connections, passes the open upper valve 30 and through the ports 33 to re-fill the cylinder-space beneath the piston. At the end of the upward stroke the lower valve 34 engages the seat 37 and prevents any leakage of the liquid from the cylinder through the slidably fitting joint between the stem 32 and neck 12. During the positive and relatively rapid downward movement of the stem 24, the resistance to flow of the liquid through the restricted passage past the valve 34 causes a back-pressure in the cylinder-space which holds the piston up against the valve 30, and prevents upward flow past said valve. Should it be desired to discharge less than the full volume of the cylinder at each operation of the device, the stop-member 26 is adjusted to limit the stroke of the stem 24, as hereinbefore described. If it is desired in a particular operation of the device to discharge less than the normal quantity of the liquid, a partial stroke of the operating-knob and stem may be made, stopping the downward movement at a mid-stroke position such as shown in Fig. 2. When the valve-stems are held stationary at such a mid-stroke position, if the piston and its stem are fitted loosely enough to permit movement thereof by gravity, a slight additional movement of the piston may occur, which will open the valve 30, but will also close the valve 34, so that no uncontrolled discharge will occur. If the stem 32 fits loosely in the neck 12, a slight suction may occur through the joint about said stem during the upward stroke of the piston, but said suction will merely serve to draw back into the cylinder any excess of the liquid which may remain clinging to the protruding portion of the stem and edges of the valve 34, thus tending to control dripping or after-flow of the liquid. The principal factor in preventing dripping of the liquid, following an ejecting operation of the device, is, however, the following: As the valve 34 and the lower portion of the piston-stem 32 are extended into the spout 14 during the ejecting operation, they displace an equivalent volume of air which must be returned to the spout during the upward stroke of the parts. After the initial ejecting operation there is a film of the liquid constantly maintained upon the screen 15 at the end of the spout, such film of liquid being held upon the screen by its capillarity, and forming in effect a liquid seal at the end of the spout. Now, during the return or upward stroke of the operating parts, air is drawn into the spout only after a sufficient reduction of pressure therein to overcome the liquid seal, and the seal is re-formed at the end of the stroke, while the air-pressure in the spout is slightly less than atmospheric. By reason of this difference of pressure, and the capillarity of the screen 15, any small portion of the liquid left in the spout at the end of an ejecting operation is retained therein until forced out by the next ejecting movement of the operating parts, and all drip or after-flow of the liquid is effectively prevented.

Now, having described my invention, what I claim and desire to secure by Letters Patent is:

1. In a device of the class described, a casing having a cylinder portion and a reduced neck extending from one end of said cylinder, a piston fitting slidably in said cylinder portion and having a tubular stem fitting slidably in said neck, said piston and tubular stem having valve-seats formed at opposite ends of the passage through the same, there being ports through the side of the stem connecting the cylinder-space with said passage intermediate said valve-seats, and a pair of valves connected for coincident movement and adapted to engage the respective valve-seats to close alternatively the ends of the passage through the piston and tubular stem.

2. In a device of the class described, a cylinder connected at one end with a source of liquid, a piston fitting slidably in said cylinder and having a stem extending slidably through the end thereof opposite said liquid source, said piston and stem having a continuous longitudinal passage and ports connecting said passage with the cylinder-space about the stem, valves arranged to seat upon opposite ends of the piston and stem to close alternatively the ends of said longitudinal passage, and means for actuating said valves to first engage their respective seats and by further movement to actuate the piston.

3. In a device of the class described, a cylinder, a piston disposed in said cylinder and having a stem extending slidably through one end of the cylinder, there being a passage through said piston and stem and ports connecting said passage with the cylinder-space about the stem, valves adapted to close the ends of said passage, and actuating means connecting said valves and adapted to close the same alternatively by movement in opposite directions.

4. A structure as set forth in claim 3, in which there is a valve-seat formed at the end of the cylinder about the piston-stem, and the valve at the end of said stem projects laterally therof to engage said seat at one limit of movement of the actuating means.

5. A structure as set forth in claim 3, including means at the end of the cylinder forming a chamber into which the piston-stem is projected by movement of the piston in one direction and from which it is withdrawn by movement of the piston in the opposite direction, said chamber having an outlet, and capillary means at said outlet adapted to maintain a liquid seal thereof.

6. A structure as set forth in claim 3, in which the valve-actuating and connecting means consists of a stem connected with the valve at the end of the piston-stem and extending through said piston stem to connect with the other valve, and a manually actuatable stem connected with the latter valve and extending outside the cylinder.

7. A structure as set forth in claim 2, in which the valve at the end of the piston-stem extends laterally thereof for engagement with a seat formed at the end of the cylinder about said piston-stem, and the valve actuating means includes a spring normally holding said laterally extended valve in engagement with said seat and with the seat at the end of the piston-stem.

THOMAS L. TITUS.